(12) United States Patent
Waszak et al.

(10) Patent No.: US 10,591,091 B1
(45) Date of Patent: Mar. 17, 2020

(54) LAMINATED U-SHAPED CHANNEL

(71) Applicant: Southwest Greene International, Inc., Oceanside, CA (US)

(72) Inventors: Stephen Waszak, Escondido, CA (US); Jeffrey Head, Oceanside, CA (US)

(73) Assignee: Southwest Greene International, Inc., Oceanside, CA (US)

( * ) Notice: Subject to any disclaimer, the term of this patent is extended or adjusted under 35 U.S.C. 154(b) by 129 days.

(21) Appl. No.: 15/876,326

(22) Filed: Jan. 22, 2018

Related U.S. Application Data

(60) Provisional application No. 62/425,552, filed on Nov. 22, 2016.

(51) Int. Cl.
 *F16L 9/18* (2006.01)
 *F16L 9/22* (2006.01)
 *H02G 3/04* (2006.01)

(52) U.S. Cl.
 CPC .............. *F16L 9/22* (2013.01); *H02G 3/0437* (2013.01)

(58) Field of Classification Search
 CPC ................................. F16L 9/22; H02G 3/0437
 USPC ................ 138/162, 115, 116, 142, 166, 141, 138/DIG. 11
 See application file for complete search history.

(56) References Cited

U.S. PATENT DOCUMENTS

| | | | | | |
|---|---|---|---|---|---|
| 527,871 | A | * | 10/1894 | Morrow | E04D 3/405 52/300 |
| 2,067,078 | A | * | 1/1937 | Faber | E03D 9/05 4/211 |
| 3,347,275 | A | * | 10/1967 | Murphy | H02G 3/0437 138/116 |
| 5,092,710 | A | * | 3/1992 | Matiere | E03F 3/04 138/105 |
| 5,663,527 | A | * | 9/1997 | Hui | H02G 3/0437 174/101 |
| 6,182,706 | B1 | * | 2/2001 | Tako | F16L 7/00 138/151 |
| 9,431,802 | B2 | * | 8/2016 | Anselmo | H02G 3/0437 |
| 2005/0225121 | A1 | * | 10/2005 | Schoemann | B60H 1/00564 296/208 |
| 2012/0000566 | A1 | * | 1/2012 | Morrissey | F16L 9/133 138/177 |
| 2014/0260071 | A1 | * | 9/2014 | Coon | E04F 17/08 52/741.1 |
| 2015/0021085 | A1 | * | 1/2015 | Bethoule | H02G 3/0406 174/40 R |

* cited by examiner

*Primary Examiner* — James F Hook
(74) *Attorney, Agent, or Firm* — James Creighton Wray

(57) ABSTRACT

A passage is formed between bases stamped, formed and laminated U-shaped channels. Interlocking locating features are formed into the inner and outer stamped and formed layers. Inner and outer components are attached by welds, glue, snap-fit or interference fit. Inner and outer components can be made of the same material and thickness or from different materials and thicknesses as needed to achieve the desired mechanical properties such as shear strength, bending strength, torsional stiffness or flexibility and longitudinal stiffness or flexibility. The materials may vary in thickness or composition along the length or height of the device to achieve the desired mechanical properties.

19 Claims, 1 Drawing Sheet

LAMINATED U-SHAPED CHANNEL

This application claims the benefit of U.S. Provisional Application No. 62/425,552 filed Nov. 22, 2016, which is hereby incorporated by reference in its entirety as if fully set forth herein.

SUMMARY OF THE INVENTION

A laminated U-shaped channel with a gap between the laminations at the base of the channel is created by laminating two stamped and formed U-shaped components. The outer stamped and formed component fits snugly over the sides of the inner stamped and formed component, leaving a gap between the inner and outer components at the U feature that can be used as clearance for additional components that would need to travel along the length of the laminated assembly.

In order to facilitate aligning, key features of the inner and outer stamped and formed components, interlocking locating features are formed into the inner and outer stamped and formed layers.

The inner and outer components may be attached to one another via welding, gluing, snap-fit, interference fit or other similar techniques.

The inner and outer components can be made of the same material and thickness, or they may be made from different materials and thicknesses as may be needed in order to achieve the desired mechanical properties such as shear strength, bending strength, torsional stiffness (or flexibility) and longitudinal stiffness (or flexibility). The materials may also vary in thickness or composition along the length or height of the device in order to achieve the desired mechanical properties.

The invention provides laminated channels having an outer channel component and an inner channel component joined to the outer channel component. The outer channel component has a base and first and second sides spaced opposite each other and connected to the base. The inner channel component has a base and first and second opposite sides spaced from each other and connected to the base. The outer channel component and the inner channel component are joined together. Inner walls of the sides of the outer channel component are joined and held on outer walls of the sides of the inner channel component, wherein the base of the outer channel component and the base of the inner channel component are spaced from each other, forming a passage in the laminated channel.

The outer channel component and the inner channel component have key features on the sides holding the channel components aligned together and interlocking the inner and outer channel components. The key features extend in complementary directions from the side walls of the inner and outer channel components. Some of the key features are rectangular recesses and complementary rectangular protrusions on adjoining walls of the sides of the inner and outer channel components. In one embodiment, the rectangular protrusions are on the outer walls of the sides of the inner channel component and the rectangular recesses are on the inner walls of the outer channel component. In one example, the interlocking key features are pressed in the sides of the inner and outer channel components.

The inner and outer channel components are attached to one another by welding, gluing, bonding or interference fit. In some embodiments, the inner and outer channel components are made from different materials. In some examples, the material differs in thickness. In some examples, the material differs in composition.

In some embodiments, one base of the bases is flat and another base is curved, forming the passage through the laminated channel. One base of the inner channel component is flat and the base of the outer channel component is curved, thereby providing the passage between the bases. Access to the passage formed in the base of the inner channel component.

These and further and other objects and features of the invention are apparent in the disclosure, which includes the above and ongoing written specification, with the claims and the drawings.

DETAILED DESCRIPTION

Figures 1, 2:
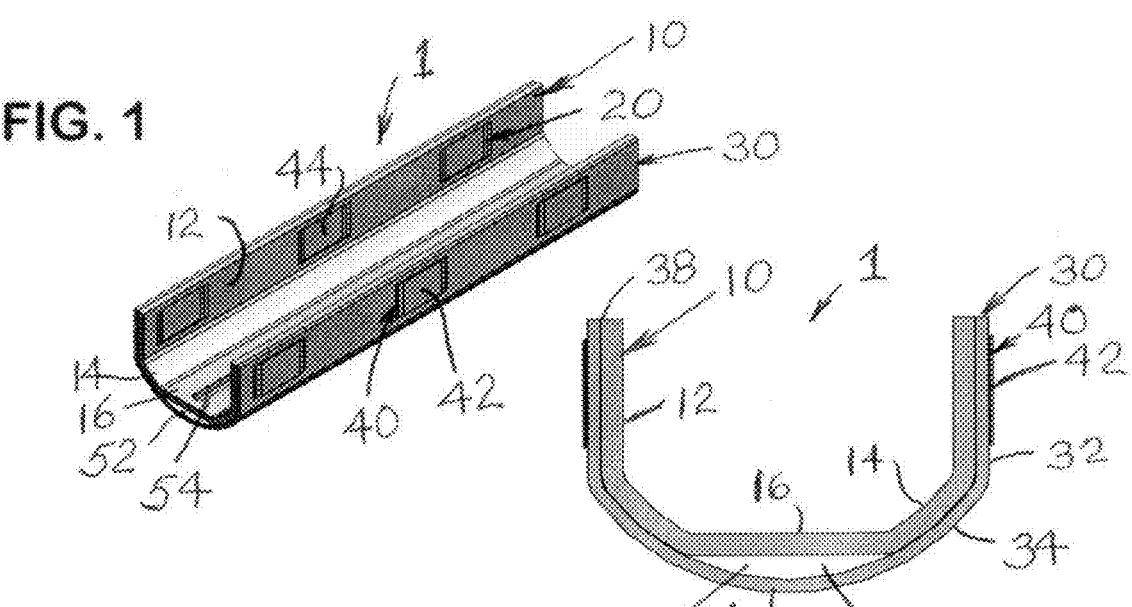
FIG. 1 is a perspective view of the new laminated channel.
FIG. 2 is an end view of the new laminated channel.

Referring to FIGS. 1 and 2, a laminated U-shaped channel 1 with a passage gap 5 between the laminations at the base 6 of the channel 1 is created by laminating two stamped and formed U-shaped components 10, 30. The outer stamped and formed component 30 fits snugly over the sides 12 of the inner stamped and formed component 10, leaving a passage 50 between the inner and outer channel components 10, 30 at the U feature 36 that can be used as clearance for additional components that would need to travel along the length of the laminated assembly.

In order to facilitate aligning, features 20, 40 of the inner 10 and outer 30 stamped and formed channel components, interlocking locating features 20, 40 are formed into the inner and outer stamped and formed layers.

The inner and outer channel components 10, 30 may be attached to one another via welding 38, gluing, snap-fit, interference fit or other similar techniques.

The inner and outer channel components 10, 30 can be made of the same material and thickness, or they may be made from different materials and thicknesses as may be needed in order to achieve the desired mechanical properties such as shear strength, bending strength, torsional stiffness or flexibility and longitudinal stiffness or flexibility. The materials may also vary in thickness or composition along the length or height of the device in order to achieve the desired mechanical properties.

Referring to FIGS. 1 and 2, U-shaped channel member 1 is made of an inner channel component 10 and an outer channel component 30. Inner channel component 10 is made of a thicker material chosen for its strength. Outer channel component 30 is made of a thinner material with an inward bias and desired finish.

In the drawings the thicker, stronger inner channel component 10 has parallel sides 12, sloping inward portions 14 and a flat base 16.

The outer channel component 30 has parallel sides 32, sloping inward portions 34 joining the sides 32 and a curved base 36.

The channel components 10 and 20 have cooperating keys 40.

As shown in FIGS. 1 and 2, the outer channel component sides 32 have outward pressed keys 40 that are receivers 42 for cooperating with and holding outward pressed cooperating keys or projections 44 on sides 12 of the inner channel component 10, as shown in FIG. 1.

The space 50 between curved base 36 of the outer channel component 20 and the base 16 of the inner channel component 10 provides a passage 52 for tubes, wires, cables, tendons or other components that need to run through the laminated channel 1.

As shown in FIG. 1, access ways 54 along base 16 provide access to the space 50 for inserting, inspecting or removing the components in the passage 52.

The laminated channel can take many shapes to create a complex geometry to meet a number of needs.

Each layer's material type and thickness can vary to net various geometric and mechanical characteristics needed.

The layering can occur one section into another, with location of one layer to the other occurring in a stacking method such as red into green into orange or in an insertion method such as red/green/orange slipped into blue.

There are locating features in each layer to properly align features from one layer to the next. The locating features can take any form, such as snap features mating through holes, mating slots or mating edges.

The number of layers is only limited by the physical ability to nest one layer into another.

One application of the layering technology is to create the complex shapes of a surgical anvil.

In one example, three layers are nested together to create the functional features.

Another example of the layering technology creates the complex shapes of a surgical stapler channel. In that example, two layers are nested together to create the functional features. In that embodiment, a channel is created between the two layers that an I-beam shaped anvil travels through, along the slot. The two layers are aligned using snap features in this case and then permanently joined to each other using laser welds to join each of the aligning features. In other examples the two layers are joined using a laser welder to create a seam weld along the mating edges of each layer.

The concept of stamping layers to create complex geometries, essentially mimicking 3D printing with stamped and formed layers of metal, can be applied to any embodiment where complex geometries are needed in high volume at competitive costs. Multiple material types are needed throughout the layered part, such that each layer is made up of the material type and thickness that is needed. Many more shapes may be made, based on the creativity sparked by this invention.

In one example, multiple channels between layers are needed for electrical insulation in multi-level wire troughs. Standard, currently available single level wire troughs, as well as the insulation between layers, could improve on standard troughs.

In one method of manufacture, the layers to be laminated are made in a die that can be single hit or progressive in nature. Each layer can be made in its own die, or layers can be made simultaneously in one die. The dies are placed in a press that exerts the force required to create the needed geometry from sheet or strip material.

Other methods of manufacture that result in formed sheets of various materials and thicknesses can also be employed.

While the invention has been described with reference to specific embodiments, modifications and variations of the invention may be constructed without departing from the scope of the invention, which is defined in the following claims.

We claim:

1. Apparatus comprising:
   a laminated channel having:
   an outer channel component and an inner channel component joined to the outer channel component,
   the outer channel component having a base and first and second sides spaced opposite each other and connected to the base,
   the inner channel component having a base and first and second opposite sides spaced from each other and connected to the base,
   the outer channel component and the inner channel component being joined together, and inner walls of the sides of the outer channel component being joined and held on walls of the outer sides of the inner channel component, wherein the base of the outer channel component and the base of the inner channel component are spaced from each other, forming a passage in the laminated channel,
   the inner channel component being nested inside the outer channel component such that the passage is formed between an outer surface of the base of the inner channel component and an inner surface of the base of the outer channel component, and
   wherein the base of the inner channel component is flat and the base of the outer channel component is curved, thereby providing the passage between the bases.

2. The apparatus of claim 1, wherein the outer channel component and the inner channel component have key features on the sides holding the channel components aligned together and interlocking the inner and outer channel components.

3. The apparatus of claim 2, wherein the key features extend in complementary directions from the side walls of the inner and outer channel components.

4. The apparatus of claim 3, wherein the key features are rectangular recesses and complementary rectangular protrusions on adjoining walls of the sides of the inner and outer channel components.

5. The apparatus of claim 4, wherein the rectangular protrusions are on the outer walls of the sides of the inner channel component and the rectangular recesses are on the inner walls of the outer channel component.

6. The apparatus of claim 3, wherein the interlocking key features are pressed in the sides of the inner and outer channel components.

7. The apparatus of claim 1, wherein the inner and outer channel components are attached to one another by welding, gluing, bonding or interference fit.

8. The apparatus of claim 1, wherein the inner and outer channel components are made from different materials.

9. The apparatus of claim 8, wherein the material differs in thickness.

10. The apparatus of claim 8, wherein the material differs in composition.

11. The apparatus of claim 1, wherein one base of the bases is flat and another base is curved, forming the passage through the laminated channel.

12. The apparatus of claim 1, further comprising access to the passage formed in the base of the inner channel component.

13. A method comprising:
   forming a laminated channel by:
   providing an outer channel component,
   providing a base and first and second sides spaced opposite each other and connected to the base on the outer channel component,
   providing an inner channel component, providing a base and first and second opposite sides spaced from each other and connected to the base on the inner channel component, joining the outer channel component and the inner channel component, joining and holding inner walls of the sides of the outer channel component on outer walls of the sides of the inner channel component, spacing from each other the base of the outer channel component and the base of the inner channel component, and forming a passage between the spaced bases in the laminated channel, the inner channel component being nested inside the outer channel component such that the passage is formed between an outer surface of the base of the inner channel component and an inner surface of the base of the outer channel component, and wherein the base of the inner channel component is flat and the base of the outer channel component is curved, thereby providing the passage between the bases.

14. The method of claim 13, further comprising providing key features on the sides of the outer channel component and the sides of the inner channel component and holding the channel components aligned and together and interlocking the inner and outer channel components.

15. The method of claim 14, wherein the providing the key features further comprises providing rectangular recesses and complementary rectangular protrusions on adjoining walls of the sides of the inner and outer channel components.

16. The method of claim 15, further comprising providing the rectangular protrusions on the outer walls of the sides of the inner channel component and providing the rectangular recesses are on the inner walls of the outer channel component.

17. The method of claim 13, wherein providing the interlocking key features comprises pressing the key features in the sides of the inner and outer channel components.

18. The method of claim 13, wherein providing the inner and outer channel components comprises providing different materials, providing the materials differing in thickness and providing the materials differing in composition, and wherein the joining of the inner and outer channel components further comprises welding, gluing, bonding or interference fitting.

19. The method of claim 13, further comprising providing one base of the bases flat and another base of the bases curved and forming the passage through the laminated channel between the flat and the curved bases.

* * * * *